United States Patent
Sanchez

[15] 3,669,439
[45] June 13, 1972

[54] CLAMP

[72] Inventor: Anastacio V. Sanchez, 10775 Foothill Boulevard, Cupertino, Calif. 95014

[22] Filed: July 6, 1970

[21] Appl. No.: 52,213

[52] U.S. Cl. .............................. 269/130, 269/139, 269/224
[51] Int. Cl. ..................... B23q 3/18, B25b 1/24, B25b 5/14
[58] Field of Search .................. 269/130, 131, 132, 224, 139

[56] References Cited

UNITED STATES PATENTS

| | | | |
|---|---|---|---|
| 2,603,994 | 7/1952 | Norton | 269/131 X |
| 2,583,917 | 1/1952 | Wiegant | 269/130 X |
| 1,089,273 | 3/1914 | Saylor | 269/224 X |
| 1,848,527 | 3/1932 | Hickey | 269/131 |
| 2,854,941 | 10/1958 | Vollmer | 269/130 X |
| 2,648,242 | 8/1953 | Walter | 269/130 X |
| 1,015,667 | 1/1912 | Caryl | 269/132 X |

FOREIGN PATENTS OR APPLICATIONS 1,168,519  10/1969  Great Britain .......................... 269/224

Primary Examiner—Wayne A. Morse, Jr.
Attorney—Jack M. Wiseman

[57] ABSTRACT

The present invention provides a clamp, which includes a seat arranged to engage the wall of a body of varying dimensions. Confronting the seat in spaced relation is a flexible member which engages the wall of the body to urge the body toward the seat to be clamped thereby. The flexible member is anchored at one end and at the other end is attached to a mechanism for releasably urging the flexible member to engage the body at varying degrees of force for a clamping action in cooperation with the seat. The seat, the flexible member and the mechanism are supported by a base to provide a unitary structure.

1 Claim, 4 Drawing Figures

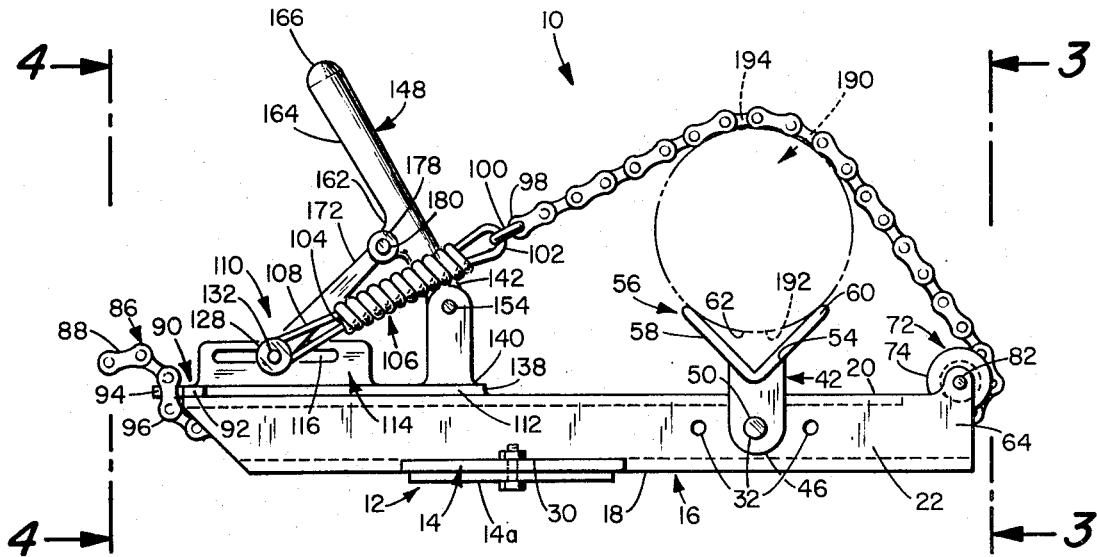

INVENTOR.
ANASTACIO SANCHEZ
BY John M. Weisman
ATTORNEY

CLAMP

BACKGROUND OF THE INVENTION

The present invention relates to clamps and, more particularly, to a clamp for holding a cylindrical body in a fixed position.

It has been conventional, in the prior art, to provide devices for holding cylindrical bodies, such as, e.g., electric generators, starter motors in fixed positions. Such known cylindrical body holding devices have, however, presented disadvantages with respect to their use, since they were suitable for cylindrical bodies of a predetermined diameter and were limited to a single force application.

SUMMARY OF THE INVENTION

The present invention provides a clamp for use to hold a body of various dimensions. In addition, such bodies may be held by the clamp of the present invention under various degrees of force. The clamp of the present invention is, at the same time, easily employed. Thus, the clamp of the present invention is versatile, adjustable and can accommodate bodies with various dimensions under various degrees of force.

BRIEF DESCRIPTION OF THE DRAWINGS

FIG. 1 is a perspective view, being partly broken away, of a clamp embodying the present invention, and shown with a cylindrical being held thereby;

FIG. 2 is a side elevational view of the clamp shown in FIG. 1;

DESCRIPTION OF THE PREFERRED EMBODIMENT

Figure 3:
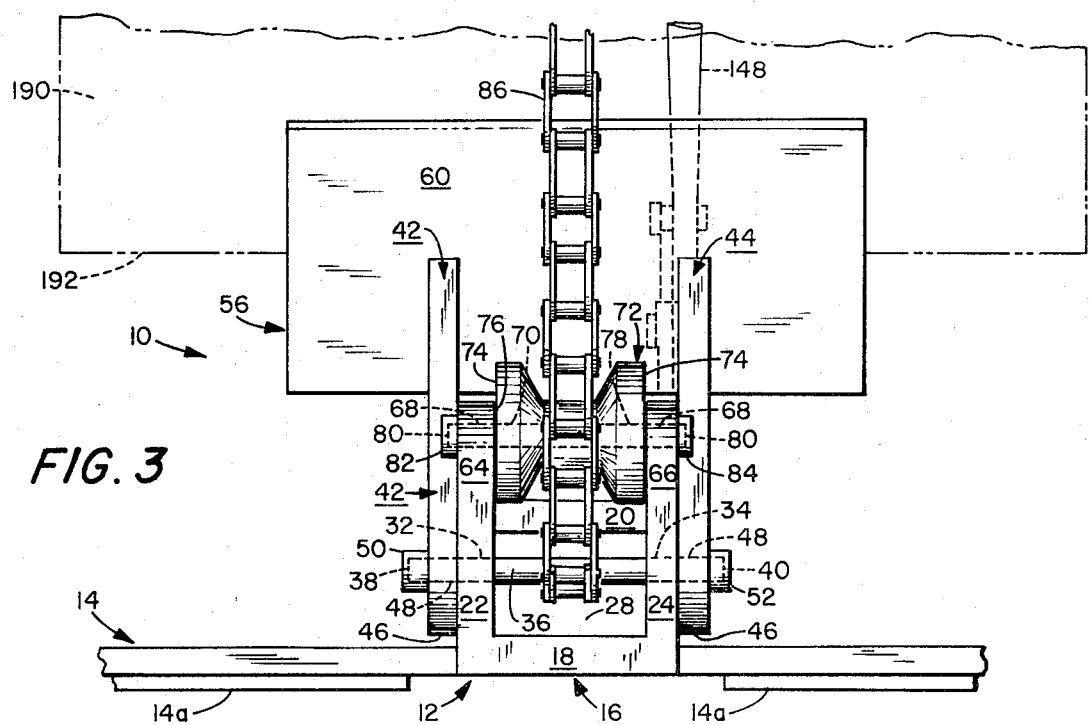
FIG. 3 is an enlarged end elevational view, being partly broken away, of the clamp shown in FIGS. 1 and 2, as viewed from one end thereof.

Illustrated in FIG. 1, is a clamp 10 embodying the present invention, which comprises a base 12. The base 12 includes a transverse plate 14 of rectangular shape, and a longitudinally extending channel bar 16 mounted on the base plate 14. The bar 16 is movable transversely along the plate 14 and has a suitable groove to receive the plate 14. The plate 14 may be adjustably mounted on a support plate 14a through a nut and bolt arrangement.

Figure 4:
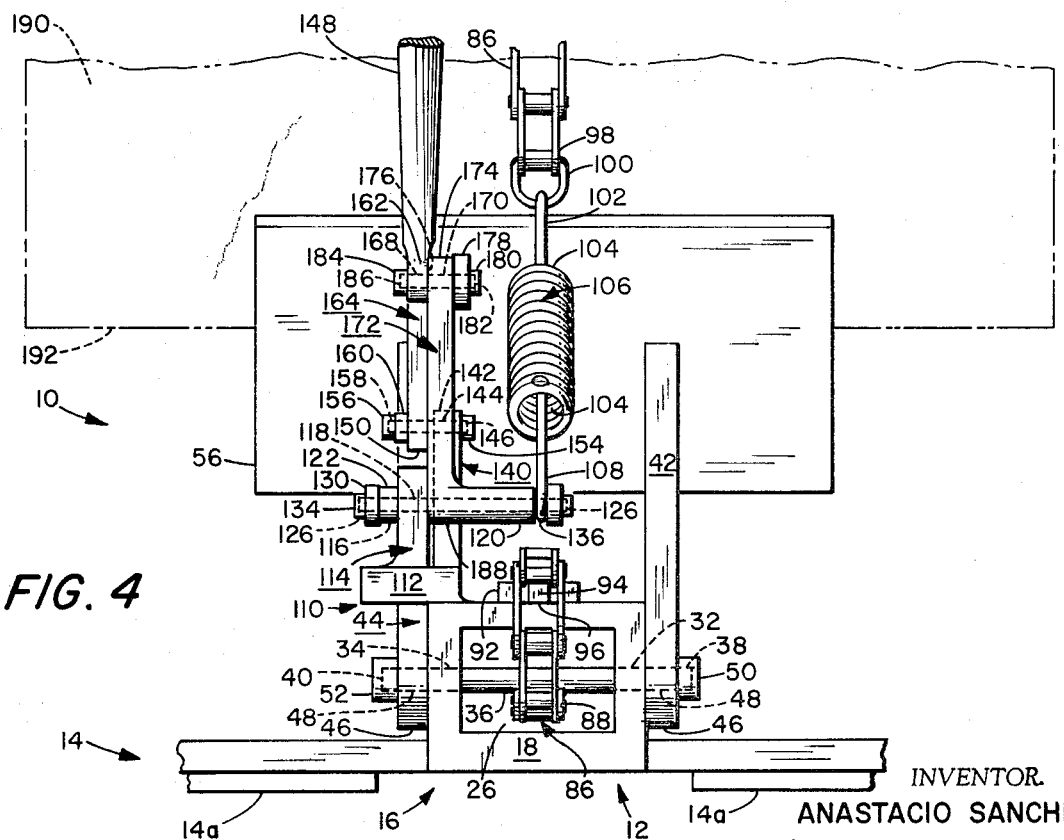
FIG. 4 is an enlarged end elevational view, being partly broken away, of the clamp shown in FIGS. 1-3, as viewed from the opposite end thereof.

The bar 16 is of rectangular cross-section; and of elongate, hollow construction. The bar 16 includes a bottom wall 18; a top wall 20; and opposite side walls 22 and 24 (See also FIGS. 2 and 3.). The bar 16 further provides opposite end openings 26 and 28 (See also FIG. 4.). The bottom wall 18 is formed with a rectangular slot 30, within which is received the base plate 14. The bar 16 is movable transversely along the plate 14 and is supported thereby.

The side wall 22 is formed with three longitudinally spaced apart openings 32, being positioned a short distance from the end opening 28. The side wall 24 is formed with three apertures 34 (two being seen), which are positioned in registration with the apertures 32, respectively.

Supported by the bar 16, and extending through one of the pairs of registering apertures 32 and 34, is a mounting pin 36. Secured to the pin 36, adjacent the opposite ends 38 and 40 thereof, respectively, are a pair of upwardly extending ears 42 and 44. Each of the ears 42 and 44 is formed, adjacent its respective lower end 46, with a circular aperture 48 for receiving the pin 36. The ears 42 and 44 are maintained secured to the pin 36 and in contact with the side walls 22 and 24 by means of a pair of retainer heads 50 and 52 threadedly secured to the opposite ends 38 and 40 of the pin 36, respectively. Thus, the ears 42 and 44 can be adjustably positioned along the bar 16 by selection of the pairs of registering opening to receive the pin 36. Also, the ears 42 and 44 with the seat formed therewith can be pivotally moved about the pin 36 to accommodate various desired angles.

Each of the ears 42 and 44 are formed with an upwardly opening V-shaped channels 54. Fixed to the ears 42 and 44 within the channels 54 is a V-shaped or trough shaped seat 56. The seat 56 is constructed of angle plates 58 and 60, which are joined together to form an upwardly opening V-shaped cavity 62. The V-shaped seat is particularly suitable for a cylindrical body. Other configurations for the seat may be employed to accommodate bodies other than a cylindrical body.

Extending from the top wall 20 of the bar 16 are ears 64 and 66. The ears 64 and 66 are positioned immediately adjacent the end opening 28; and at the opposite side walls 22 and 24, respectively. Each of the ears 64 and 66 is formed with a circular aperture 68.

Supported by the ears 64 and 66 is a mounting pin 70, upon which is mounted a pulley 72. Opposite sides 74 of the pulley 72 about the inner surfaces 76 and 78 of the ears 64 and 66, respectively. The pin 70, adjacent its opposite ends 80, extends through the apertures 68 of the ears 64 and 66, respectively. The pin 70 is maintained in position by means of two retainer heads 82 and 84, threadedly secured to the opposite ends 80, respectively.

Entering the bar 16, at the end opening 26, is a flexible member 86 which is in the form of a chain. The inner end portion 88 of the chain 86 is secured in fixed position to the bar 16, by means of a link selecting securing means 90. The link selecting securing means 90 include an anchor pin 92, which is of generally T-shaped cross-section. The anchor pin 92 is mounted on the top wall 20 of the bar 16, adjacent the end opening 26. The leg 94 of the anchor pin 92 projects outwardly to selectively engage one of the links 96 of the chain end portion 88 to anchor one end of the chain 86, thereby regulating the effective length of the chain 86.

The chain 86 extends from the inner end portion 88 thereof, through the bar 16; through the end opening 28; and around the pulley 72. At its free end 98, the chain 86 is connected, by means of a hook 100, to a linking member 102, which is secured to one of the ends 104 of a helical spring 106. At its other end 104, the spring 106 is connected by means of a linking member 108, to a force adjusting mechanism 110.

The force adjusting mechanism 110 includes a base plate 112, which is mounted on the top wall 20 of the bar 16, adjacent the end opening 26, and overlying the side wall 24. Integral with the base plate 112, and upwardly extending therefrom, is a slotted guide member 114. The guide member 114 is formed with a slot 116, which extends longitudinally along the bar 16.

A rod 118 is slidable within the slot 116 and is retained therein by a hub 120 and a collar 122. The hub 120 and the collar 122 are mounted on the rod 118, adjacent the opposite ends 124 and 126 of the latter, respectively. The hub 120 and collar 122 are maintained in position on the rod 118 by means of two apertured discs 128 and 130. The disc 128 and 130 are maintained on the rod 118 by means of two retainer heads 132 and 134 threadedly connected to the opposite ends 124 and 126, respectively.

The link 108 is anchored, at its end 136 between the hub 120 and the apertured disc 128.

Integral with the base plate 112 and extending upwardly therefrom, adjacent the rearward end 138 thereof, is a post 140. The post 140 is formed adjacent the upper end 142 thereof with an aperture 144. Rotatably mounted on the post 140 by means of a pin 146 is a lever 148. The lever 148 adjacent the inner end 150 thereof is formed with an aperture 152. The pin 146 extends through the aperture 144 in the post 140, and the aperture 152 in the lever 148. Two retainer heads 154 and 156 are threadedly secured to the opposite ends 158 of the pin 146, respectively. The retainer head 154 serves to retain the pin 146 within the aperture 144. An apertured disc 160, held on the pin 146 by means of the retainer head 156 serves to hold the lever 148 in its mounted position on the pin 146. The fulcrum for the lever 148 is the pin 146.

The lever 148 is formed with a hub 162. The hub 162 is located at the inner edge 164 of the lever 148, and intermediate the inner end 150 and the outer end 166 of the latter. The hub 162 is formed with a transversely extending base 168.

Rotatable within the hub 162 by means of a pin 170 is a connecting rod 172. The connecting rod 172 is formed adjacent the upper end 174 thereof with an aperture 176. The pin 170 extends through the aperture 176, and the aperture 168 in the hub 162. An apertured disc 178 is held on the pin 170 by means of a retainer head 180, being threadedly secured to the inner end 182 of the pin 170. The disc 178 serves to maintain the upper end 174 of the connecting rod 172 in position on the pin 170. A retainer head 184 threadedly secured to the outer end 186 of the pin 170 serves to retain the latter in mounted position on the hub 162. The rod 172, at its lower end 188 is integrally formed with to the hub 120.

The clamp 10 serves to grip a body, such as, e.g., a generator starter motor 190, in a prescribed position. The clamp 10 may grip a body of various dimensions; and under any various degrees of force.

In employing the clamp 10, the bar 16 may initially be mounted, by means of the base plate 14, on a suitable support surface. The seat 56 may then be selectively mounted along the bar 16. Thus, the mounting pin 36 may first be placed in a position of extension through one of the three pairs of oppositely positioned apertures 32 and 34 and the seat 56 may be pivoted thereabout to accommodate various desired angular positions for the seat 56. The ears 42 and 44 may then be secured to the pin 36 by means of the retainer heads 50 and 52, respectively. The generator starter motor 190 may subsequently be placed in position on the seat 56 within the cavity 62. The plates 58 and 60 will then engage the cylindrical wall 192 of the generator starter motor 190.

The chain 86, adjacent its end 98 may then be manually placed in a position of engagement with the cylindrical wall 194 of the generator starter motor 190 confronting the seat 56 at a diametrically opposite location. The chain 86, may subsequently be manually secured by means of the link 96 to the leg 94 of the anchor pin 92. The chain 86 may thus be selectively secured in its contact with the cylindrical wall 194 of the generator starter motor 190.

The gripping engagement of the chain 86 with the cylindrical wall 194 of the generator starter motor 190, and the force under which such engagement is maintained, may then be manually adjusted, by the actuation of the lever 148. The movement of the lever 148 will serve to vary the position of the rod 172, and the hub 120, for rectilinear movement of the bar 118 within the slot 116. The tension in the spring 106 will thus be varied for the adjustment of the degree of force with which the chain 86 engages the cylindrical wall 194.

When a desired degree of force of engagement of the chain 86 with the cylindrical wall 194 has been obtained, the clamp 10 will serve both to support the weight of the body generator starter motor 190; and to hold the latter in the prescribed position, and under the desired degree of force. The clamp 10 may thus be employed to retain in position a cylindrical body of various diameters; and under various degrees of force.

I claim:

A clamp comprising:

a. a support;
b. a seat on said support for engaging the wall of a body;
c. a chain confronting said seat to engage the wall of a body at a location confronting said seat;
d. anchor means on said support engaging one of the links at one end of said chain for adjustably securing said one end of said chain to said support in fixed position, said anchor means including a pin mounted in a fixed position on said support for engaging said one link of said one end of said chain, and
e. a mechanism on said support connected to the other end of said chain for controlling the engagement of said chain with said wall by applying an adjustable force to the other end of said chain, said mechanism including a guide member on said support formed with a slot and a rod positioned within said slot, said other end of said chain being connected to said rod, said rod being reciprocable within said slot for adjustably positioning said other end of said chain to control the force applied to said wall through engagement with said chain, said mechanism including manually operable means for moving said rod within said slot to control the force applied to said wall through engagement with said chain, said manually operable means including a connecting rod and a lever, one end of said connecting rod being pivotally secured to said lever, said lever being mounted for pivotal movement on said support to pivot said connecting rod for movement within said slot, said mechanism comprising a spring secured to said other end of said chain, said mechanism applying a force to the other end of said chain to adjust the tension of said spring for regulating the force applied to said wall by said chain.

* * * * *